Patented Nov. 3, 1931

1,829,838

UNITED STATES PATENT OFFICE

HARRY NYQUIST, OF MILLBURN, NEW JERSEY, ASSIGNOR TO AMERICAN TELEPHONE AND TELEGRAPH COMPANY, A CORPORATION OF NEW YORK

TRANSMISSION DELAY MEASURING SYSTEM

Application filed May 6, 1930. Serial No. 450,223.

This invention relates to transmission delay measuring systems, and particularly to a method and means for measuring such delay at very low frequencies, as of the order of 10 cycles per second, as well as at high frequencies.

In the patent to Nyquist No. 1,645,618 that issued on October 18, 1927, is described a method for measuring transmission delay that consists in modulating an input current of known frequency by another current of very low frequency, transmitting the modulated current through a system capable of producing a delay in the transmission of such current, also transmitting through another channel the low frequency current, detecting the low frequency envelope of the modulated current, measuring the phase difference between the detected current and the low frequency current as transmitted and determining from the phase difference the delay in transmission in units of time. While the principle upon which that method is based is applicable to the measurement of low as well as high frequencies, experience has shown that the arrangement therein described gives the most satisfactory results above 250 cycles per second.

The present invention resides in a method and means, that while capable of measuring accurately the transmission delay produced by a network upon high frequencies, is at the same time, well adapted for measuring delay at very low frequencies, for example of the order of 10 cycles per second.

Figure 1:
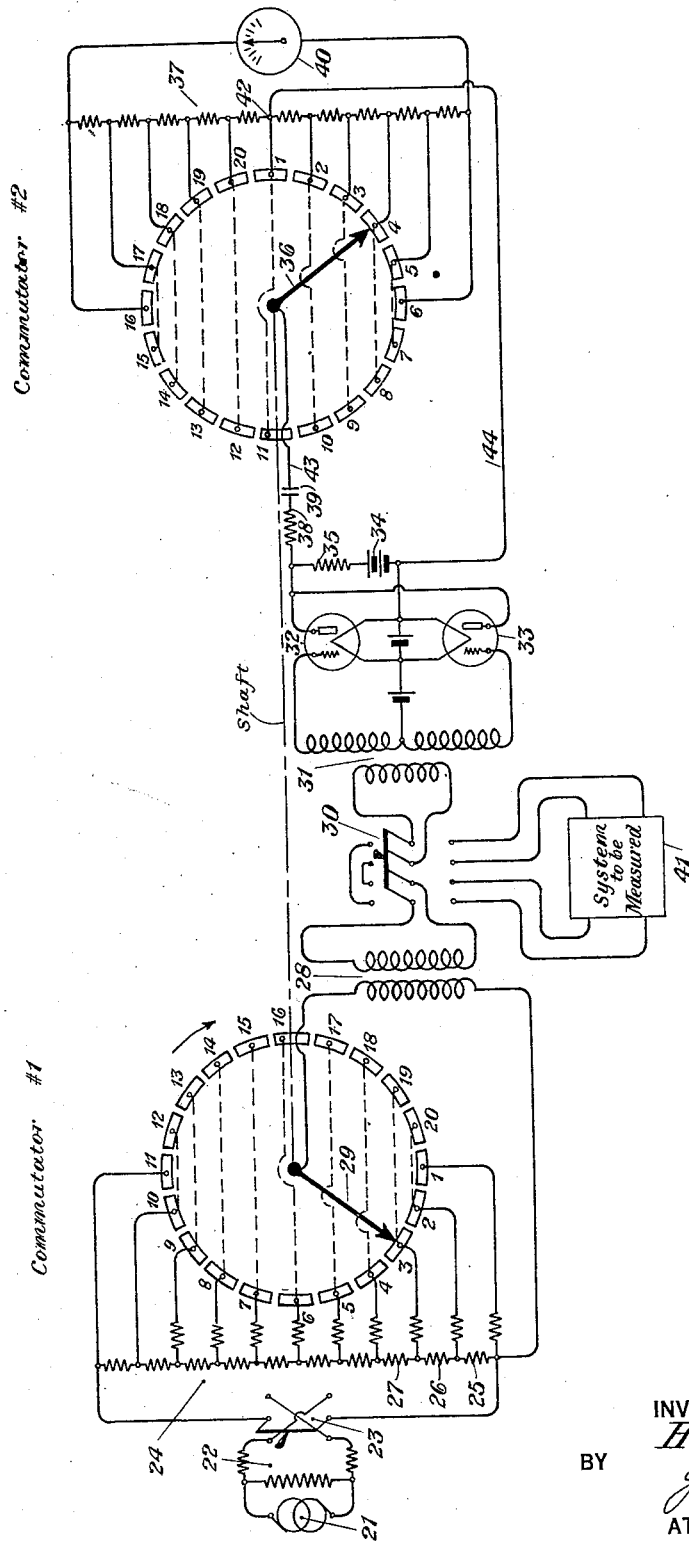
Figure 2:
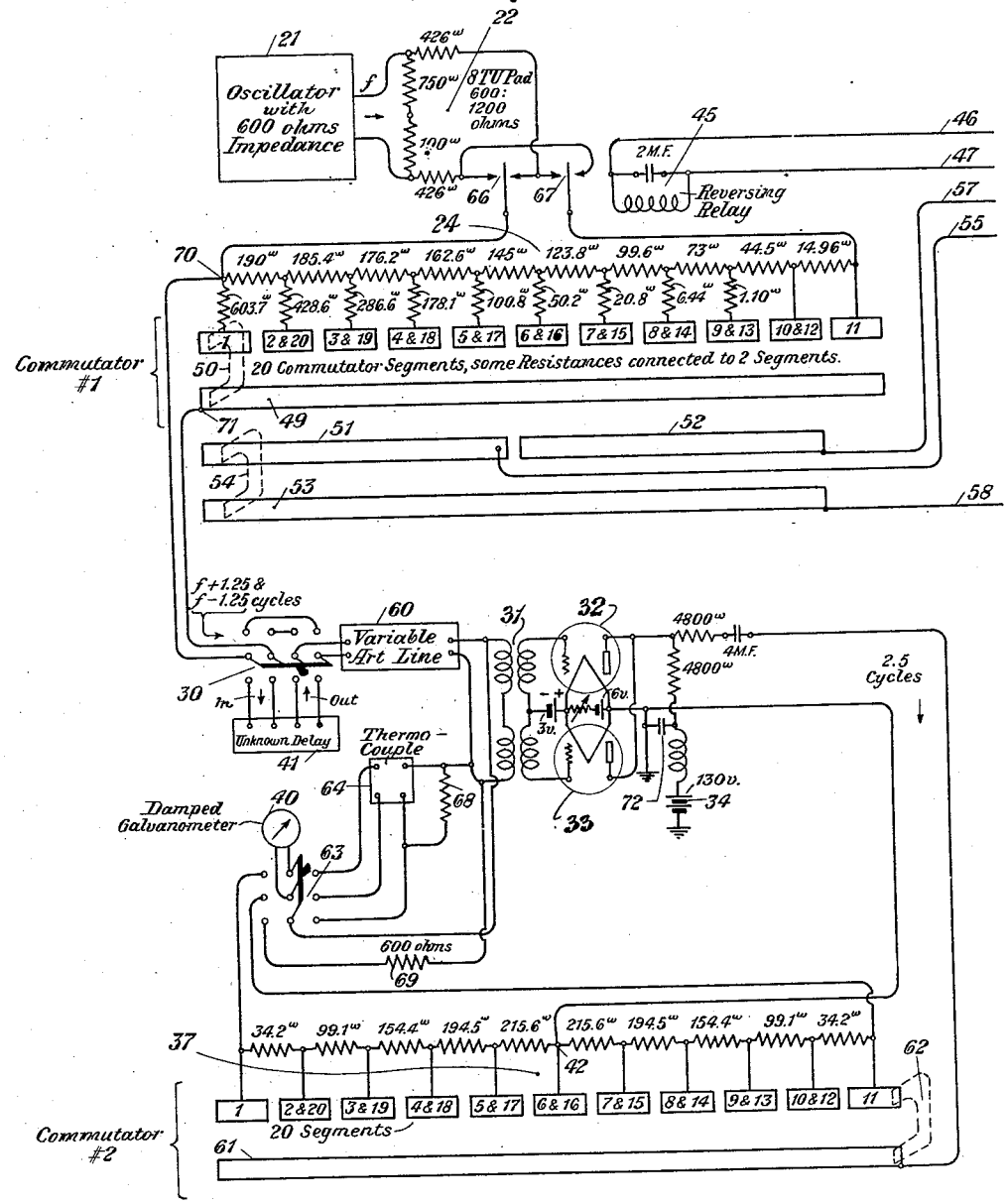
Figure 3:
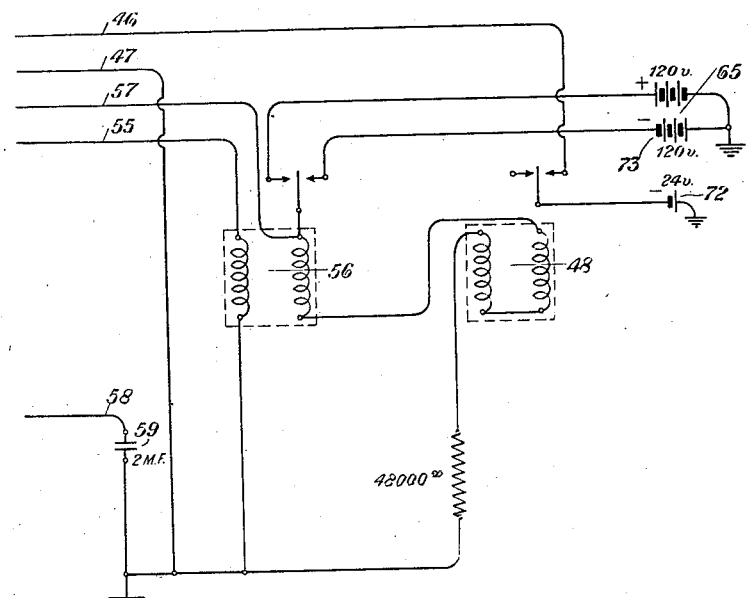
Figure 4:
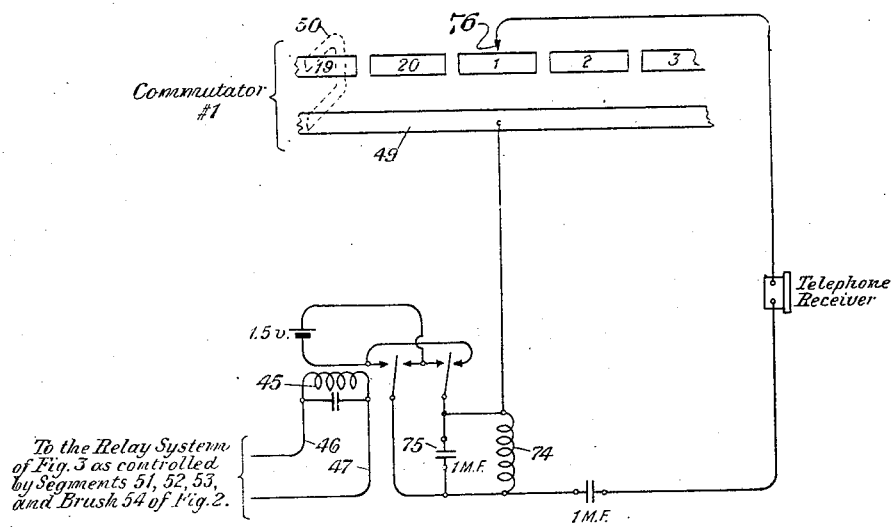

The invention will be clearly understood from the following description when read in conection with the attached drawings of which Figure 1 shows schematically the embodiment of the invention in a very simple form, the purpose of which is to describe the underlying principle of the invention; Figs. 2 and 3, when arranged so that the similarly numbered conductors of those figures are in line, show the circuit connections in detail of a measuring set embodying the invention; and Fig. 4 is a fragmentary sketch illustrating the description of a test employed in operating the measuring set.

In Fig. 1, the generator 21 represents symbolically any source capable of generating oscillations of frequencies ranging upwards from a lower limit of 10 cycles or less up to 25 cycles or more. The generator is connected with the reversing switch through the network 22 the purpose of which is to make the impedance of the source of oscillations when looked into from the switch contacts equal to a predetermined value such, for example, as 1200 ohms. The switch 23 is connected between the network 22 and the potentiometer 24, that is made up of a plurality of resistances. A commutator comprising a plurality of segments numbered 1 to 20, is connected to the potentiometer 24. The potentiometer 24 is divided into a plurality of sections such as 25, 26 and the taps from the junction points of successive sections are connected with pairs of segments of the commutator. For example, the tap from the junction of sections 25 and 26 is connected with segments 2 and 20 so that the voltage across section 25 will be applied to the transformer 28 whenever the brush 29 rests upon segment 2 or segment 20, which segments are strapped together. It will accordingly be seen that as the brush 29 moves over the segments in the direction represented by the arrow, the voltage applied to the primary of transformer 28 will rise, reaching a maximum when the brush reaches segment 11 and will then diminish by steps, reaching zero when the the brush again rests upon segment 1. The action of the commutator is to modulate the current of the frequency $f$ generated by the oscillator 21, the modulating frequency depending upon the rate of rotation of the brush 29 over the segments of the commutator. As has been shown, the commutator creates onehalf of the modulated wave during one revolution of the brush 29. By throwing the reversing switch to its opposite position, while the brush is passing over segment 1, the other half of the modulated wave may be created during the subsequent revolution of the said brush. It will accordingly be seen that by the operation of the switch 23 during two revolutions of the brush 29, a complete modulated wave is produced.

In the practical embodiment of this invention, as shown in Figs. 2 and 3, which will later be described fully, the commutator employed is that of a multiplex telegraph distributor, the lowest speed of which is 2.5 revolutions per second. That arrangement produces a 1.25-cycle wave, so that the bands produced by the modulating action may be represented by $f+1.25$ and $f-1.25$ cycles per second. The secondary winding of transformer 28 is connected with two blades of the four-blade switch 30, the other two blades of which are connected with the primary of transformer 31. The upper contacts of switch 30 are connected in such manner that the output of transformer 28 will be directly connected with the input of transformer 31 when the switch is thrown to its upper position. When the switch is thrown to its lower position, there will be connected into the circuit between transformers 28 and 31 the network or transducer that produces the delay of the signal transmitted therethrough, which delay is to be measured. The secondary of transformer 31 is connected with the input sides of the detector tubes 32, 33 the plates of which are connected with the source of potential 34, having in series therewith a resistance 35 of the order of 4800 ohms. The output circuit of the detector is connected with the brush 36 of commutator No. 2 and also with the midpoint of the potentiometer 37. The connection with the brush 36 includes the resistance 38 which is of the order of 4800 ohms and also the condenser 39. As in the case of commutator No. 1, the pairs of segments of commutator No. 2 are connected together and those pairs are connected across portions of the potentiometer 37. The galvanometer 40 is bridged across the potentiometer. That galvanometer should be sufficiently sluggish as to respond only to the direct current component of the detecting operation, that is effected by the commutator and its associated potentiometer. The brushes 29 and 36 of the two commutators are arranged to rotate together but the arrangement is such that one of the brushes, for example 29, may be shifted at will to alter the phase angle that it makes with brush 36.

The manner in which the system works to measure the delay introduced by the network 41 in the transmission of a low frequency wave therethrough will now be described. Let it be assumed that the oscillator 21 is generating a low frequency wave of the order of 10 cycles. That wave will be impressed across the potentiometer 24 and it will be fully modulated by the movement of the brush 29 over the commutator No. 1 and by the manipulation of the switch 23. The modulated wave generated by the commutator and the potentiometer is theoretically a sine wave of 1.25 cycles except for the presence of certain harmonics, such as the 19th, 21st, 39th, 41st, etc., which harmonics are small enough to be neglected. Those harmonics arise from the fact that the wave produced by the commutating device is a stepped wave, although it follows the sine form. The sidebands of modulation, namely $f+1.25$ and $f-1.25$, are impressed by the transformer 28 upon the circuit containing the switch 30, which switch should at the outset be in its upper position so that the waves will be impressed directly upon the detectors 32, 33. The two frequencies $f+1.25$ and $f-1.25$ are converted by the detector into 2.5 cycles and also a number of higher frequencies, the latter having no appreciable effect on the galvanometer on account of its large damping winding.

It will be seen that when a voltage is applied across the conductors 43, 44, the commutating device No. 2 causes a full wave to be generated for each revolution of the brush. In the present assumed case, a voltage of 2.5 cycles would be generated, since the shaft to which the brush 36 is connected operates at 2.5 revolutions per second. Since the output of the detector 32, 33 is a 2.5-cycle wave, the action of the commutating device No. 2 is to detect that wave and to impress upon the galvanometer 40 the direct current resultant, the magnitude of which depends upon the phase angle between the brushes 29 and 36.

The manner in which the commutating device No. 2 operates is as follows: Let the wave coming from the detector 32—33 be proportional to $\sin(2\pi 2.5t+\theta)$ and the wave generated by commutator 2 be proportional to $\sin 2\pi 2.5t)$, where $\theta$ is an angle depending on the setting of the brush 29 which may be rotated upon its shaft with respect to brush 36, rotated by the same shaft. Since the wave generated by commutator #2 completely modulates the detector output, we have a current flowing through the galvanometer 40 which is proportional to $$\sin(2\pi 2.5t)\sin(2\pi 2.5t+\theta) = -\tfrac{1}{2}\cos(2\pi 5t+\theta) + \tfrac{1}{2}\cos(-\theta)$$

The five-cycle component has no appreciable effect on the galvanometer, but the d—c. component, $\tfrac{1}{2}\cos(-\theta)$, causes a deflection except where $\theta$ is 90° or 270°, when the meter reads zero.

The phase angle between the brushes 29 and 36 of the two commutating devices is preferably adjusted so that the galvanometer 40 reads zero, although zero reading is not necessary if the network 41 has no amplification or attenuation. The switch 30 is then thrown to its downward position, thereby connecting into the circuit the network 41, whose delaying effect upon the signal wave is to be determined. The brush 29 is then shifted upon the axis on which it rotates to such extent as to produce the same resultant upon the galvanometer 40. The difference between the phase angle then existing between the brushes 29 and 36, viz. $\theta'$, and the phase angle between those brushes when the switch 30 was in its upper position, viz. $\theta$, is an indication of the delay introduced in the transmission of the modulated signal by the network 41. That angular delay may be translated into units of time in the following manner. Since in the assumed case the shaft carrying the brushes 29 and 36 rotates one revolution in 0.4 second, and since there are 360° in a revolution, 1° shift of the brush corresponds to $0.4/360 = .00111$ second delay. That figure multiplied by the number of degrees difference between the phase angles, shows the time delay introduced by the network 41 in the transmission of the signal of the frequency $f$ generated by 21 as modulated by the commutating device No. 1 whose frequency is 1.25 cycles per second.

In the arrangement shown in Figs. 2 and 3 the same numerals have been employed to indicate parts similar to all figures. Thus, the oscillator 21, having an impedance of 600 ohms, is connected with the pad 22 comprising a plurality of resistances such that the combined resistance looking into the network from the right thereof is 1200 ohms. The terminals of the network are connected with the contacts of the reversing relay 45 that serves the same purpose as the reversing switch 23 of Fig. 1. The reversing relay 45 is connected by conductors 46 and 47 with the system of the controlling relays shown in Fig. 3, conductor 46 being connected with the right-hand contact of relay 48 and conductor 47 being connected to ground. The armatures of relay 45 are connected with the outer terminals of the resistance network of the potentiometer 24, which network comprises a plurality of resistances connected with the segments or pairs of segments of the commutating device No. 1. That commutating device includes a segmental ring containing 20 segments (of which only 11 have been shown), the pairs of segments connected together being indicated by numerals. The commutating device also includes the continuous ring 49 and a brush 50 that sweeps over the segmental ring and the continuous ring so as to effectively transmit to the detector 32—33 voltages determined by the position of the brush 50 upon the segmental ring.

The segments 51 and 52 and the ring 53, together with the brush 54, serve to control the operation of the reversing relay 45. The segment 51 is connected by conductor 55 with the left-hand winding of control relay 56. The segment 52 is connected by conductor 57 with the armature and the right-hand winding of relay 56. The ring 53 is connected by conductor 58 with one side of the condenser 59 of Fig. 3.

The commutating device No. 1 is connected with the switch 30 which, when thrown in its upper position, serves to connect the commutator with the variable artificial line 60, and thereby with the primary winding of transformer 31, whose secondary is connected with the input of the detector 32—33. The switch 30 in its lower position connects into the circuit the network 41 producing the unknown delay. The output of the said detector is connected with the commutating device No. 2 comprising a segmental ring containing 20 segments, a continuous ring 61, and a brush 62 that is arranged to sweep over the said rings. The potentiometer 37 is connected with two of the left-hand contacts of the 3-pole switch 63, of which two of the blades are connected with the galvanometer 40. Bridged across the primary winding of transformer 31 is a circuit for measuring the magnitude of the input current of the detector. That circuit includes a thermocouple 64 the output of which is connected with two of the right-hand contacts of switch 63.

The manner in which the circuit of Figs. 2 and 3 operates is as follows: Let it be assumed that relay 56 of Fig. 3 is jarred so that its armature touches either of its contact points, for example, the left-hand one. Current will accordingly flow from the battery 65 through the left-hand contact, the right-hand winding of relay 56, both windings of relay 48 to ground, energizing both relays, and thereby causing the armature of relay 56 to be held against its left-hand contact and at the same time moving the armature of relay 48 on its left-hand contact and holding it there. Let it be assumed that, at this instant, brush 54 has moved onto segment 51 and ring 53, and that brush 50 has moved onto segment 1 and ring 49 as shown in Fig. 2. The connecting of segment 51 and ring 53 by the brush 54 establishes a circuit that may be traced from the ungrounded side of condenser 59 (see Fig. 3), over conductor 58, ring 53, brush 54, segment 51, conductor 55, left hand winding of relay 56 to ground, but since there is no charge on the condenser, no effect is produced upon relay 56. At this instant relay 45 is deenergized, and we will assume that its armatures rest upon the left hand contacts 66 and 67. The oscillator 21 will accordingly impress a voltage wave of frequency $f$ across potentiometer 24. The brush 50, starting from segment 1, will sweep over all of the segments in succession, and return again to segment 1, causing thereby the production of a half cycle of a modulated wave, representing the modulation of frequency $f$ by the frequency of the commutator. During the time in which the brush 50 is moving over segments 1 to 10 inclusive the brush 54 moves over segment 51, and passes onto segment 52 when brush 50 reaches segment 11. Brush 54 thereupon connects segment 52 and ring 53 and establishes a circuit including battery 65, left hand contact of relay 56, conductor 57, segment 52, brush 54, ring 53, conductor 58, condenser 59 to ground, thereby charging the said condenser. Brush 54 will continue to travel over segment 52 while brush 50 is passing over segments 11 to 20. When brush 54 leaves segment 52, the circuit of condenser 59 will be opened, and as soon as brush 54 passes onto segment 51 the said condenser will discharge through a path including conductor 58, ring 53, brush 54, segment 51, conductor 55 and the left hand winding of relay 56, thereby causing the armature of that relay to move to its right hand contact. That connects the negative battery 73 to the armature of relay 56, and thereby reverses the current through relay 48, causing its armature to touch its right hand contact. Thereupon, battery 72 is connected by conductor 46 with reversing relay 45, and as the result thereof the armatures of that relay are moved to the right hand contacts. By this time, brush 50 will have moved onto segment 1 and the commutating system is ready to produce the other half cycle of the modulated wave. It is desirable to point out that brush 54 is slightly in advance of brush 50 in order to enable the control relays 56 and 48 to bring about the operation of reversing relay 45, so that the oscillator 21 will be properly connected with the potentiometer 24 for the generation of the next half cycle, when brush 50 passes onto segment 1.

Brushes 54 and 50 will continue rotation and when brush 54 passes onto segment 52 the condenser 59 will again be charged by battery 73, the circuit including the said battery, right hand contact of relay 56, conductor 57, segment 52, brush 54, ring 53, conductor 58 and condenser 59. The condenser is thus ready to cause the operation of relays 56 and 46, and thereby bring about the operation of reversing relay 45 as soon as the brush 54 again moves onto segment 51.

The operations just described produce waves of frequency $f$ freely modulated by the commutator of a frequency of 1.25 cycles. That wave will be impressed by the switch 30 upon the transformer 31, the switch being in its upward, calibrating position. Since the apparatus shown is designed to match lines and apparatus of 600 ohms impedance, a 600 ohm variable artificial line is used to regulate the current amplitude at the input to the detector. When the switch 63 is thrown to the right there will be connected across the primary of transformer 31 the thermocouple 64 and the resistance 68. When the switch 63 is thrown to the left the resistance 69 of 600 ohms is connected across said transformer. The artificial line 60 is adjusted so that the same current is used at all frequencies. When it is desired to send one milliwatt into the unknown delay network 41, the oscillator should give approximately 14 $ab$ above one milliwatt, since that is the loss measured between the oscillator and the points 70, 71 at the output of the potentiometer. When current of that magnitude is sent it is found that 3.5 TU in the artificial line will give full scale deflection of the galvanometer 40 with the switch 30 in its upward position and switch 63 to the right. The same deflection is obtained with the switch 30 downward when the loss in the artificial line is decreased by an amount equal to the loss in the unknown delay network. While it is desirable to maintain the current at the input to the detector constant to avoid "pep" effects in the detector, it is not desirable to use such a high current at this point when measuring with switch 63 thrown to the left since the amplification given by the detector will permit interfering frequencies to affect the galvanometer unless an additional 10 TU loss is inserted in the artificial line when the switch 63 is moved from right to left. It is desirable to compare the currents at the detector input for the calibrating and measuring positions of switch 30 to make sure that they are nearly the same value, using higher current strength to read the galvanometer more easily and then introducing the 10 TU loss to avoid the effect of interfering frequencies.

The two frequencies $f+1.25$ and $f-1.25$ are converted by the detector 32, 33 into 2.5 cycles and a number of higher frequencies, which latter have no appreciable effect on the galvanometer on account of its large damping windings. The provision of a filter 72 with the battery 34 protects the circuit from battery noises. The 2.5-cycle current impressed across the commutating device No. 2 will be detected thereby and the direct current resulting therefrom will be impressed upon the galvanometer 40 when the switch 63 is in its left-hand position.

The manner in which the commutating device No. 2 operates has been fully described in connection with Fig. 1, and need not be completely stated again. As previously mentioned, the current flowing through the galvanometer, when switch 63 is thrown to the left is proportional to $$\sin (2\pi 2.5 t) \sin (2\pi 2.5 t + \theta) = -\tfrac{1}{2} \cos (2\pi 5 t + \theta) + \tfrac{1}{2} \cos (-\theta)$$

The five-cycle component has no appreciable effect on the galvanometer but the $d-c$ component, $\tfrac{1}{2} \cos (-\theta)$, causes a deflection except where $\theta$ is 90° or 270°, when the meter reads zero.

The measurement of delay consists of taking the difference between the two settings $\theta_1$ and $\theta_2$ of the brushes which are necessary to produce zero reading of the galvanometer, with and without the unknown delay in the circuit. Since the motor rotates one revolution in 0.4 second, and since there are 360° in a revolution, one degree shift of the brushes corresponds to $0.4/360 = .00111$ second envelope delay. Where the measured delay is very large it may be necessary to add a constant delay of 0.4n second, where n is any whole number, to the reading obtained in this manner. While reference has been made to the shifting of the brushes to determine the phase difference, it will, of course, be understood that the relative position of the brushes may be fixedly maintained, and the phase angle may be measured by rotating the segmental commutating rings.

The arrangement shown in Fig. 4 is intended to adjust the relative positions of the brushes 50 and 54 in order to eliminate the effect upon the reversing relay 45 of the time lag in the operation of the control relays. It has been pointed out hereinbefore that brush 54 is normally positioned to be in advance of brush 50 in order to bring about the operation of the control relays and of the reversing relay 45 so that the oscillator 21 will be properly connected with the potentiometer 24 when the brush 50 is on segment 1. To effect the proper adjustment of brushes 50 and 54 the oscillator 21 and the pad 22 are disconnected from the contacts of relay 45 and a source of direct current, preferably a 1.5 volt battery, is connected with the said contacts. The armatures of relay 45 are also disconnected from the potentiometer and are connected with the inductance 74 and the condenser 75, the latter serving as a spark-killer. Those resistances of the potentiometer 24 that normally are connected with segments 20, 1 and 2 are disconnected therefrom and a telephone receiver is arranged to be connected at will between each of the segments mentioned (by using the contact point 76), and one side of the inductance 74, the other side of which is connected with the continuous ring 49. Relay 45 is connected with the control system shown in Figs. 2 and 3.

Assuming that the brushes are rotating, relay 45 will be operated each time the brush 54 moves onto segment 51. Assuming, for example, that the armatures of 45 are moved to the left as the result of the passing of the brush 54 onto segment 51, current will flow through the inductance coil 74 and a voltage will be established across it. If at that instant the contact point 76 is held against segment 1 of that commutator, and no current flows through the telephone receiver, i. e. clicks are not heard, it will be evident that brushes 54 and 50 are not properly adjusted, since brush 50 is not upon segment 1. Thereupon the contact point 76 connected with the telephone receiver will be moved from segment 1 to segment 20 in order to determine whether brush 50 is on the latter segment at the instant the armatures were moved to their contacts. If a click is heard in the telephone receiver when the contact rests upon segment 20 it indicates that the brush 50 is too far back of brush 54. Brush 50 will accordingly be moved and further tests will be made to determine whether the adjustment has been sufficient to cause brush 50 to be on segment 1 when the armatures of relay 45 have moved to their contact points. If after the adjustment has the made no clicks are heard in the telephone receiver when the contact point is placed against segments 20 and 2, as the brush sweeps over the segments, it indicates that brushes 50 and 54 have been properly adjusted.

It is to be understood that while the invention has been disclosed as embodied in particular forms and arrangements, the invention is capable of embodiment in other and different forms without departing from the spirit and scope of the appended claims.

What is claimed is:

1. In a transmission delay measuring system, the method that consists in modulating a wave of known frequency by a different frequency, transmitting the side-bands of such modulation over a medium capable of producing substantially no delay in transmission, beating together the said side bands, detecting that frequency that is double the said difference frequency by which the original wave was modulated, measuring the direct current resultant of the said detecting step, then transmitting the said side-bands over a medium producing a measurable delay, beating together the side-bands and detecting the said double frequency, adjusting the phase angle of the last detecting step to give the same direct current resultant as is given when transmission is effected over the medium producing no delay, and measuring the said phase angle.

2. In a transmission delay measuring system, the method that consists in modulating a wave of known frequency by a different frequency, transmitting the side-bands of modulation over a medium capable of producing substantially no delay in transmission, beating together the said side-bands, detecting that frequency that is double the said different frequency by which the original wave was modulated measuring the direct current resultant of the said detecting step, adjusting the phase angle $\theta$ of detection until zero direct current is indicated, then transmitting the said side-bands over a medium producing a measurable delay, beating together those side-bands and detecting the said double frequency, adjusting the phase angle $\theta'$ in the last detecting step to give zero direct current resultant, and measuring the difference between the said phase angles $\theta$ and $\theta'$.

3. In a transmission delay measuring system, the combination with a source of waves of known frequency of means to fully modulate the said waves at a fixed frequency differing from the said known frequency, a transmitting medium, capable of producing substantially no delay, upon which the side-bands of modulation are impressed, means for beating together the said side-bands, means to detect that resultant of the beating operation whose frequency is double the said fixed frequency, a device to indicate the magnitude of the detected double frequency current, a second transmitting medium capable of introducing a measurable delay, and switching means to connect the second transmitting medium between the said modulating means and the said beating means in substitution for the said first transmitting medium.

4. In a transmission delay measuring system, the combination with a source of oscillations of a potentiometer upon which the said oscillations are impressed, a commutator comprising a segmental ring and a brush capable of rotating thereover, the segments being so connected with the said potentiometer that the said oscillations will be modulated by the rotation of the said brush, a network so connected with the said commutator that the modulated oscillations will be impressed thereon, a detector connected with the network to detect the current of the frequency at which the brush rotates, a second commutator also comprising a segmental ring and a brush rotating thereover, a second potentiometer connected with the said second commutator, means to connect the output of the said detector between the brush of the second commutator and the midpoint of the second potentiometer and a galvanometer bridged across the said second commutator.

5. In a transmission delay measuring system, the combination with a source of oscillations of a source of low frequency variations to modulate completely the said oscillations thereby producing two side-bands, a path producing substantially no delay in transmission, a second path capable of producing a finite delay to be determined, switching means adapted to apply the modulated oscillations to either path, a detector adapted for connection with either path to beat together the said side-bands to produce a wave of double the frequency of the said variations, means to produce a direct current resultant from the said wave of double frequency, an indicating device to show the magnitude of the said direct current, and means to indicate the phase difference produced by the transmission over the two paths.

6. In a transmission delay measuring system, the combination with a source of oscillations of known frequency variable at will, of a potentiometer made up of a plurality of sections, a reversing relay adapted to connect the said source with the said potentiometer and to reverse the phase of the oscillations thus applied, a commutator having its segments connected with the sections of the said potentiometer, a brush adapted to rotate over the said commutator to modulate the said oscillations, a path having substantially no delay upon which the side-bands of modulation may be impressed, a second path having a finite delay, switching means to connect either path with the modulating means, means to beat together the said side-bands, means to control the magnitude of the said bands as thus beaten, means to detect that resultant of the beating operation whose frequency is twice the frequency of rotation of the said brush, and an indicating device to show the magnitude of the direct current resultant.

7. In a transmission delay measuring system, the combination with a source of oscillations of a potentiometer comprising a plurality of sections, a reversing relay connecting the said source to the said potentiometer adapted by its operation to change the phase of the oscillations impressed upon the potentiometer through the contacts of said relay, a commutating device connected with the sections of the potentiometer to modulate the said oscillations by variations of a different frequency, a transmitting medium upon which the side-bands of modulation are impressed, the said medium being capable of producing a finite delay, means to beat together the said side-bands, means to detect that resultant of the beating operation whose frequency is double that of the said variations, an indicating device upon which the direct current resultant of the said double frequency may be impressed, and switching means adapted to control the said reversing relay whereby the connections between the said source and the said potentiometer will be reversed after each cycle of the said commutator.

8. In a signal delay measuring system, the combination with a transducer of means to send carrier current modulated by low frequency current through the said transducer, means connected with the transducer output to detect the resultant, whose frequency is double that of the low frequency current, and means to make phase comparison between the double frequency resultant and the low frequency current.

In testimony whereof, I have signed my name to this specification this 5th day of May, 1930.

HARRY NYQUIST.